(12) United States Patent
Callaghan et al.

(10) Patent No.: US 11,613,338 B2
(45) Date of Patent: Mar. 28, 2023

(54) MODULAR SHIFT PROTECTION ALGORITHM FOR MARINE VESSEL

(71) Applicant: Caterpillar Inc., Peoria, IL (US)

(72) Inventors: Merritt P. Callaghan, Cypress, TX (US); Cameron S. Gandy, Houston, TX (US); Brian P. Neathery, Hockley, TX (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 17/443,718

(22) Filed: Jul. 27, 2021

(65) Prior Publication Data
US 2023/0033010 A1 Feb. 2, 2023

(51) Int. Cl.
| | |
|---|---|
| *B63H 21/21* | (2006.01) |
| *B63H 20/20* | (2006.01) |
| *F02D 31/00* | (2006.01) |
| *F02D 41/02* | (2006.01) |
| *B63H 25/50* | (2006.01) |

(52) U.S. Cl.
CPC ............ *B63H 21/21* (2013.01); *B63H 20/20* (2013.01); *B63H 25/50* (2013.01); *F02D 31/001* (2013.01); *F02D 41/021* (2013.01); *B63H 2021/216* (2013.01)

(58) Field of Classification Search
CPC ....... F16H 61/12; B63H 21/21; B63H 21/213; B63H 21/22
See application file for complete search history.

(56) References Cited

U.S. PATENT DOCUMENTS

| | | | |
|---|---|---|---|
| 6,679,740 B1 | 1/2004 | Imanaka et al. | |
| 6,942,530 B1 | 9/2005 | Hall et al. | |
| 7,377,827 B1 | 5/2008 | Sturdy et al. | |
| 8,182,396 B2 | 5/2012 | Martin et al. | |
| 8,454,402 B1* | 6/2013 | Arbuckle | B63H 21/21 |
| | | | 440/86 |
| 8,740,659 B2 | 6/2014 | Kuriyagawa et al. | |
| 9,441,724 B1 | 9/2016 | Pugh | |
| 10,155,578 B1 | 12/2018 | Osthelder et al. | |
| 10,234,031 B2 | 3/2019 | Leehaug | |
| 10,794,474 B1 | 10/2020 | Bielefeld | |
| 2011/0196552 A1* | 8/2011 | Garon | B63H 21/21 |
| | | | 701/21 |
| 2022/0243808 A1* | 8/2022 | Amano | F16H 63/50 |
| 2022/0258748 A1* | 8/2022 | Vedantam | H04W 84/18 |

OTHER PUBLICATIONS

Written Opinion and International Search Report for Int'l. Patent Appln. No PCT/US2022/036196, dated Nov. 18, 2022 (9 pgs).

* cited by examiner

*Primary Examiner* — John Kwon
(74) *Attorney, Agent, or Firm* — von Briesen & Roper, s.c.

(57) ABSTRACT

A first method of protecting an engine and a transmission of a marine vessel during gear shifts and a second method of programming one or more Shift Protection Sequences (SPS) are disclosed. The first method includes receiving a Shift Request (SR) and activating a SPS from among a plurality of enabled SPS. The second method includes configuring a Shift Protection Type (SPT); enabling and configuring a plurality of required and SPS variables; and, optionally, enabling and configuring a plurality of optional SPS variables. The SPT may be a Basic Shift Protection (BSP), which includes time-based SPS; or the SPT may be an Advanced Shift Protection (ASP), which includes alternate time-based and operating-variable based SPS. The SPS of the ASP may be incrementally programmed and added to the BSP.

20 Claims, 5 Drawing Sheets

MODULAR SHIFT PROTECTION ALGORITHM FOR MARINE VESSEL

TECHNICAL FIELD

The present disclosure generally relates to shift protection logic and, more specifically, to a modular shift protection algorithm for a marine vessel.

BACKGROUND

Modern marine vessels typically employ Marine Propulsion Systems (MPS) to propel the vessel through bodies of water, the systems typically including an engine or power unit to provide power; a transmission system to change directions and to transfer power from the engine to a propeller shaft; the propeller shaft to transfer power from the transmission to a propeller; and the propeller to transfer and convert power from the propeller shaft into linear thrust. The MPS may often comprise one or more operator controls, such as a throttle and a gear shift, through which an operator may operatively control the engine and the transmission, respectively.

The MPS may further comprise a Propulsion Control Processor (PCP) programmed with one or more Shift Protection Sequence(s) (SPS). The SPS executes shift protection logic to protect the engine, the transmission, and other components of the marine vessel during gear shifts. In particular, engine stalling is a common risk that can occur when a vessel traveling in a first direction suddenly shifts into an opposite gear. The linear momentum of the vessel imparts a drag load on the propeller, which continues to rotate in the first direction of travel/rotation, and which continues to transfer torque through the propeller shaft to the transmission and engine. A sudden gear shift may thus cause a sudden load increase on the engine and potentially stall the engine. Accordingly, SPS are useful algorithms for protecting the components of an MPS against engine stalls, clutch failures, and other equipment malfunctions while balancing and/or maximizing a degree of operator control. SPS may be particularly applicable in "crash reversal" operations, wherein an operator, in detecting an impending obstacle in the first direction of travel, suddenly "reverses" gears to prevent a "crash".

Many strategies are known in the art which protect the MPS of a marine vessel during gear shifts. For example, it is generally well-known to configure a Maximum Engine Speed to Shift (MESTS) variable, wherein no gear shifts or only certain gear shifts are allowed if an Engine Speed (ES) exceeds the MESTS. It is further known in the art to configure certain time-based SPS, i.e. SPS which delay a requested gear shift for a predetermined period of time. However, many time-based SPS are based on "blind" and/or open-loop logic, and may fail to efficiently protect the MPS in many gear shift scenarios. For example, the delay may be too brief and the engine stall regardless; or the delay may be too extended and a desired crash reversal operation forfeited.

More complex SPS are also suggested by the prior art. U.S. Pat. No. 7,377,827 by Sturdy et. al (hereinafter "Sturdy") and assigned to the Sturdy Corporation discloses an MPS including a controller that executes a transmission shift in consideration of the ES and a Transmission Oil Pressure (TOP). In Sturdy, one or more operating variables of the engine and the transmission are measured and compared with a plurality of configurable set points, which effectively dictate if and when the transmission shifts occur during a Directional Shift Request (DSR).

Unfortunately, the system and method taught by Sturdy may require additional sensory and/or communication hardware, preexisting operating data for the engine and the transmission systems, and a knowledgeable technician to configure—all of which may increase an overall cost of the product and increase a complexity for implementation.

In fact, the contrast between the aforementioned, time-based and open-loop SPS and the operating-variable-based SPS taught by Sturdy generally reflects a state of the art, wherein marine vessel manufacturers and customers may be forced to decide between a shift protection logic that is simple but inefficient; and a shift protection logic that is efficient but complex and costly.

Accordingly, there remains a need in the art for a modular shift protection algorithm capable of incorporating both simple, time-based SPS and complex, operating-variable-based SPS into the same package. There further remains a need for a modular shift protection algorithm wherein a plurality of SPS of varying degrees of complexity may be optionally, incrementally, and piecewise enabled and configured depending on the needs of the manufacturer or customer.

SUMMARY OF THE DISCLOSURE

According to a first aspect of the present disclosure, a method of programming one or more Shift Protection Sequence(s) (SPS) which protect an engine and a transmission of a marine vessel during gear shifts is disclosed. The method comprises configuring a Shift Protection Type (SPT) to be a Basic Shift Protection (BSP) or an Advanced Shift Protection (ASP), wherein: if the SPT is configured to be the BSP, by default, a Normal Shift Protection (NSP) and a Basic Crash Reversal (BCR) are enabled; or if the SPT is configured to be the ASP, by default, the NSP, the BCR, a Slow Vessel Mode Shift Protection (SVMSP) and an Advanced Crash Reversal (ACR) are enabled. The method further comprise configuring a plurality of required SPS variables, including: configuring a Maximum Engine Speed to Shift (MESTS); configuring a Shift protection engine speed limit (SPESL); configuring a Shift Protection Hold Time (SPHT); configuring an Acceleration Time (AT); configuring a Deceleration Time (DT); and configuring a Neutral Hold Time (NHT).

According to a second aspect of the present disclosure, a method of protecting an engine and a transmission of a marine vessel during gear shifts is disclosed. The method comprises receiving a Shift Request (SR) and activating an SPS from among a plurality of enabled SPS. The plurality of enabled SPS always includes an NSP and a BCR which execute time-based shift protection logic. The plurality of enabled SPS optionally include a SVMSP and an ACR which execute alternate time-based shift protection logic and operating-variable-based shift protection logic.

These and other aspects and features of the present disclosure will be more readily understood after reading the following description in conjunction with the accompanying drawings.

DETAILED DESCRIPTION

Figure 1:
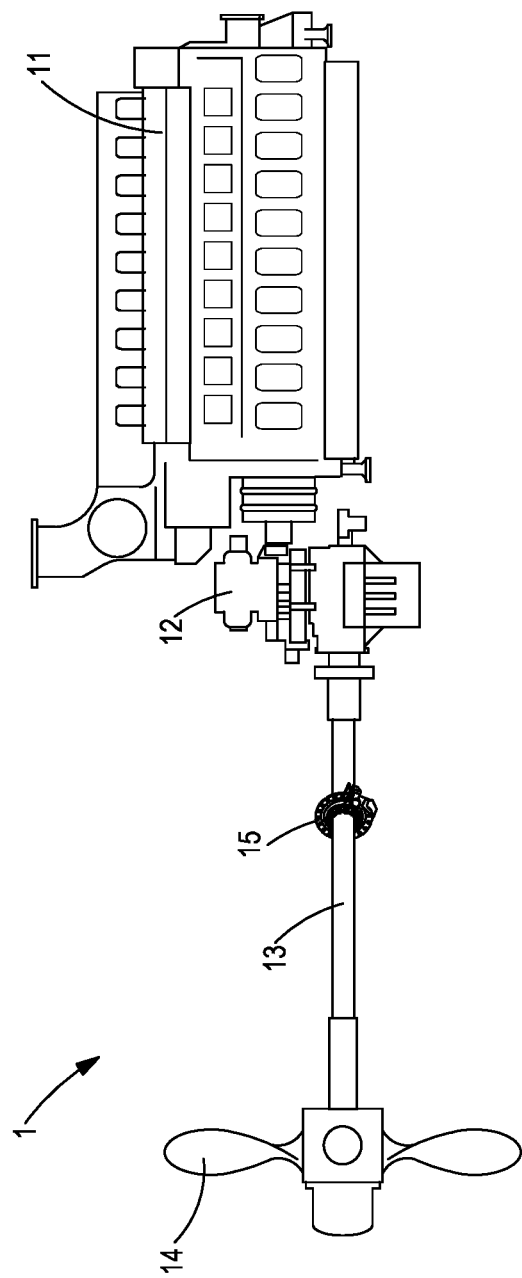
FIG. 1 is a diagram of an MPS according to an embodiment of the present disclosure.

Referring now to the drawings and with specific reference to FIG. 1, a diagram of a Marine Propulsion System (MPS) 1 is generally referred to by a reference numeral 1. The MPS 1 may be housed in, provide power to, and operatively propel a marine vessel, such as a container ship, tanker, passenger ship, fishing vessel, motor yacht, personal watercraft, or other vessel, where no limitation is intended herein. The MPS 1 may comprise an engine 11 or power unit, a transmission 12, a propeller shaft 13, a propeller 14, and, in some embodiments, a shaft brake 15. During operation of the MPS 1, torque generated by the engine 11 may be transferred through the transmission 12 and the propeller shaft 13 to rotate the propeller 14, thereby driving the marine vessel through a body of water. Further, the transmission 12 may control a direction of rotation of the propeller 14 by shifting into one of a Forward Gear (F), a Neutral Gear (N), or a Reverse Gear (R).

The MPS 1 may be operatively controlled by an operator 2 through one or more operator controls, including a throttle 21 and a gear shift 22 (not shown). The throttle 21 may operatively control the engine 11 and, more specifically, an Engine Speed (ES) of the engine 11. The gear shift 22 may operatively control the transmission 12 and, more specifically, a Current Gear (G) of the transmission 12. In some exemplary embodiments, the MPS 1 may comprise two separate and independent sets of the engine 11, the transmission 12, the propeller shaft 13, the propeller 14, and, where applicable, the shaft brake 15, one of each located on a port side and a starboard side of the marine vessel. In such embodiments, separate throttles 21 and gear shifts 22 may be configured to operatively control each side and set of the MPS 1.

The MPS 1 may further comprise a Propulsion Control Processor (PCP) 16 (not shown), which operatively controls the engine 11, the transmission 12, and, where applicable, the shaft brake 15. The PCP 16 may further be programmed to enable, configure, activate, execute, and/or deactivate one or more Shift Protection Sequence(s) (SPS) during an operation of the marine vessel. In some embodiments, the MPS 1 may further comprise an Engine Control Unit (ECU) 17 for operatively controlling the engine 11. In some embodiments, the ECU 17 may be included in the PCP 16 and constitute the same component and, in other embodiments, the ECU 17 may constitute a separate component of the MPS 1. The role and scope of the PCP 16 and the ECU 17 may be better understood after a brief description of the following terms.

For the purposes of the present disclosure, the term "requested" may refer to any request inputted from the operator 2 through the throttle 21 or the gear shift 22. For example, the operator 2 may input a Requested Engine Speed (RES) or a Requested Gear (RG) by altering a state of the throttle 21 and the gear shift 22, respectively. The state of the throttle 21 and/or the gear shift 22 are then communicated to the PCP 16. In some circumstances, the PCP 16 may operatively communicate the RES to the engine 11 or the ECU 17, and/or the PCP 16 may operatively communicate the RG to the transmission 12. More specifically, the PCP 16 may directly convert the RES and/or the RG into a Commanded Engine Speed (CES) and/or a Commanded Gear (CG), respectively, which may be in the form of a Pulse Wave Modulation (PWM) signal or related protocol known in the art. However, in other circumstances, the PCP 16 may determine that an SPS should be activated, for example, where an immediate gear reversal at the current ES could stall the engine 11. In these circumstances, the PCP 16 may override the input from the operator 2 by activating and executing one of a plurality of enabled SPS. Once the SPS is deactivated, control of the throttle 21 and the gear shift 22 are once more returned to the operator 2.

For the purposes of the present disclosure, the term "commanded" may refer to any command communicated from the PCP 16 to the engine 11, the ECU 17, or to the transmission 12. For example, the PCP 16 may communicate the CES or the CG to the engine 11 and to the transmission 12, respectively. As previously discussed, the CES and/or the CG may be derived from the RES and/or the RG, or they may be derived from the shift protection logic of an active SPS. In some embodiments, the CES and the CG may take the form of a PWM signal or related protocol known in the art.

For the purposes of the present disclosure, the term Engine Speed (ES) may refer to an "actual" or measured RPM of the engine 11, and may be distinguished from the RES or the CES. Likewise, the term Current Gear (G) may refer to an "actual" gear of the transmission 12, and may be distinguished from the RG or the CG. It should be understood that, even if the CES is communicated to the engine 11 or the ECU 17, the ES may differ from the CES due to normal acceleration, deceleration, and/or variance of the engine 11. Likewise, it should be understood that, even if the CG is communicated to the transmission 12, the G may briefly differ from the CG due to normal shifting mechanisms, and mechanisms and/or protocols which are not discussed in the present disclosure.

Figure 2:
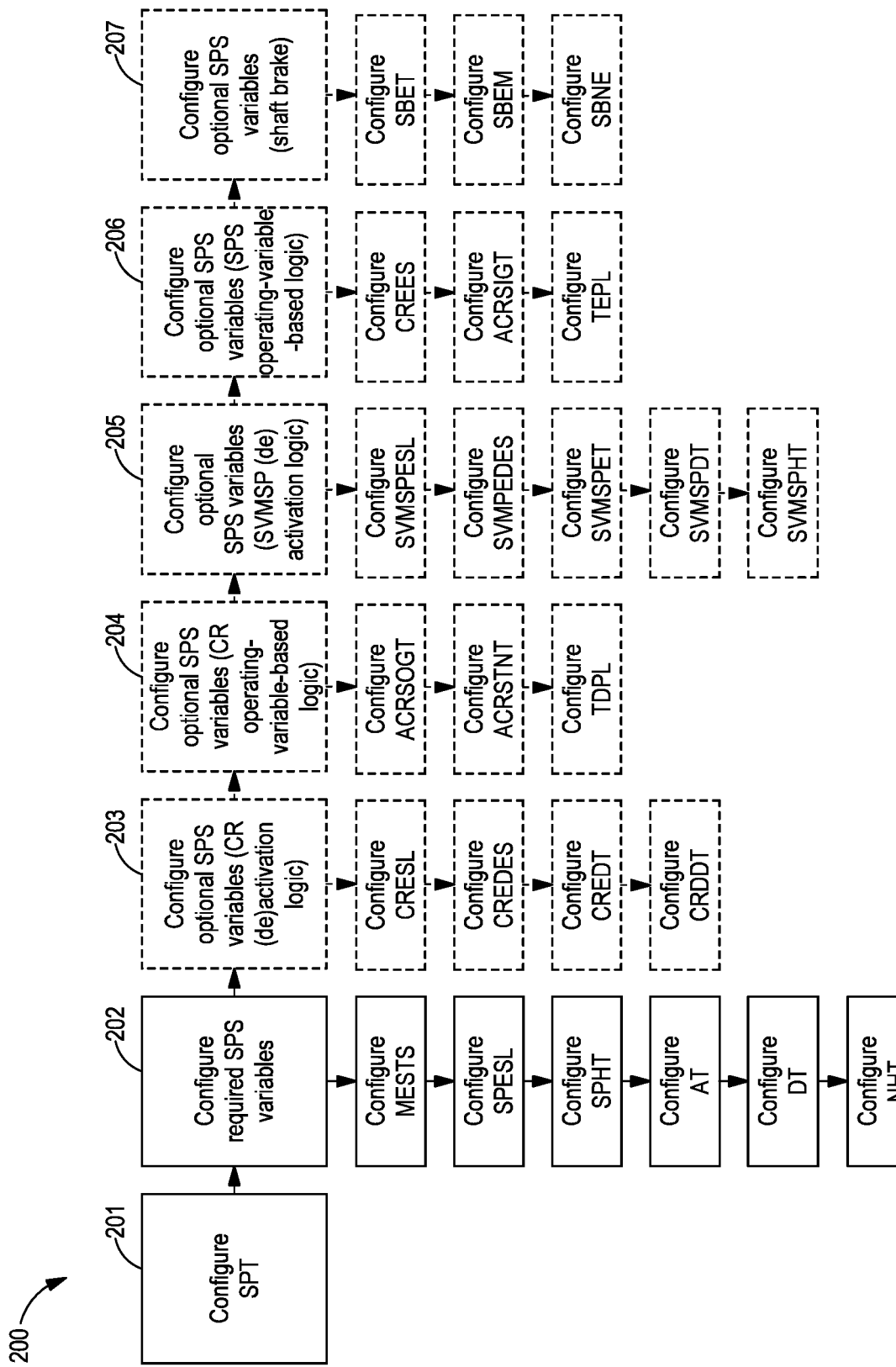
FIG. 2 is a flowchart depicting a method of programming one or more SPS which protect an engine and a transmission of a marine vessel during gear shifts, according to another embodiment of the present disclosure.

Turning now to FIG. 2, a method of programming one or more SPS which protect an engine 11 and a transmission 12 of a marine vessel during gear shifts is generally referred to be a reference numeral 200. The SPS may be programmed into the PCP 16 by a technician, an engineer, an operator 2, an Original Equipment Manufacturer (OEM), or similar personnel, where no limitation is intended herein. The one or more SPS may be enabled and tuned via the enablement and configuration of a plurality of SPS variables.

Put in other terms, the enablement and configuration of the SPS variables by the technician may effectively dictate which SPS are enabled for the MPS 1; and may further dictate an activation logic, a deactivation logic, and/or a shift protection logic for each enabled SPS for the MPS 1. It is worth noting that the enablement and configuration of some SPS variables are required, while the enablement and configuration of other SPS variables are optional. In some embodiments, enablement and configuration of the optional SPS variables may be at the discretion of the manufacturer, technician, engineer, operator 2, the OEM, customer, etc.

With continued reference to FIG. 2, the method may comprise first configuring a Shift Protection Type (SPT) to be a Basic Shift Protection (BSP) or an Advanced Shift Protection (ASP) (block 201). By default, a plurality of SPS are enabled by the PCP 16 according to the SPT. If the SPT is configured to be the BSP, by default, a NormalShift Protection (NSP) and a Basic Crash Reversal (BCR) are enabled. If the SPT is configured to be the ASP, by default, the SPS of the BSP are also enabled, including the NSP and the BCR. In addition, if the SPT is configured to be the ASP, by default, a Slow Vessel Mode Shift Protection (SVMSP) and an Advanced Crash Reversal (ACR) are also enabled.

In some embodiments, the BSP includes only time-based SPS, i.e. SPS which execute time-based shift protection logic. The ASP may include both time-based SPS and operating-variable-based SPS, i.e. SPS which execute both time-based and operating-variable-based shift protection logic. In some embodiments, the ASP may include different time-based parameters compared to its BSP counterparts. And in other embodiments, the operating-variable-based shift protection logic of the ASP may execute quicker than the time-based shift protection logic of its BSP counterparts.

While the above describe the default enabled SPS for each SPT, the default SPS of the ASP may nonetheless be manually and incrementally enabled and added to the BSP by the technician. Likewise, the default SPS of the ASP may be manually and incrementally disabled and removed from the ASP. In this manner, the MPS 1 of the present disclosure may incorporate a modular shift protection logic including both simple, time-based SPS and complex, operating-variable based SPS in the same package.

Once the SPT is configured, a plurality of required SPS variables may be configured (block 202). As previously discussed, the required SPS variables must be configured regardless of the SPT and regardless of which SPS are enabled. In some embodiments, configuration of the required SPS variables may further include: configuring a Maximum Engine Speed to Shift (MESTS); configuring a Shift Protection Engine Speed Limit (SPESL); configuring a Shift Protection Hold Time (SPHT); configuring an Acceleration Time (AT); configuring a Deceleration Time (DT); and configuring a Neutral Hold Time (NHT), each of which will be described in greater detail below.

For the purposes of the present disclosure, the MESTS defines the maximum ES above which no gear shifts are allowed. In some embodiments, the ES must be at least 50 RPM below the MESTS for the PCP 16 to shift the transmission 12. The MESTS applies to all Shift Requests (SR), including Directional Shift Requests (DSR), Shift into Neutral Requests (SINR), and Shift Out of Neutral Requests (SONR). If a DSR is received while the ES exceeds the MESTS, then the CES is set to a Low Idle Engine Speed (LI) and the CG is held in the G until the ES decreases to at least 50 RPM below the MESTS.

For the purposes of the present disclosure, a DSR is defined as a SR from the F to the R or vice versa.

For the purposes of the present disclosure, a SINR is defined as a SR from the F to the N or from the R to the N.

For the purposes of the present disclosure, a SONR is defined as a SR from the N to the F or from the N to the R.

For the purposes of the present disclosure, the LI refers to a preset RPM parameter of the engine 11 and/or the ECU 17, which may be set according to known standards within the art and/or according to specific applicational requirements.

For the purposes of the present disclosure, the SPESL defines the default CES for any active SPS until a throttle control is returned to the operator. The SPESL is always the CES if the active SPS is the NSP. In some embodiments, the SPESL may instead define an artificial ceiling for the CES instead of setting the CES during the active SPS.

For the purposes of the present disclosure, the SPHT defines a period of time the CES is held at the SPESL during a Shift into Gear Phase (SIG-phase), which will be described in greater detail further in the specification. A Shift Protection Hold Time Counter (SPHTC) associated with the SPHT begins to count down as soon as any SPS enters the SIG-phase.

For the purposes of the present disclosure, the AT defines a period of time required for the marine vessel to reach top speed from zero knots while a PORT/STBD Requested Throttle Position (PSRTP) is set to 100%. In some embodiments, the AT is determined during sea trials in accordance with Sea Trials and Transmission requirements.

For the purposes of the present disclosure, the PSRTP comprises the current RES(s) and the current RG(s) based on a state of the throttle(s) 21 and the gear shift(s) 22. If the MPS 1 comprises only one set of the engine 11, transmission 12, throttle 21, and gear shift 22, the PSRTP may, contrary to the name, define the state of the single throttle 21 and gear shift 22. However, if the MPS 1 comprises two independent sets of engines 11, transmissions 12, throttles 21, and gear shifts 22, e.g. one located on each of a port side and a starboard side of the marine vessel, the PSRTP may, in line with the name, define the state of both throttles 21 and gear shifts 22.

For the purposes of the present disclosure, the DT defines a period of time required for the ES to reduce to [LI+100] RPM after the PSRTP is changed from 100% to 0% while the vessel is traveling at top speed. In an embodiment, the DT is determined during sea trials in accordance with Sea Trials and Transmission requirements.

For the purposes of the present disclosure, the NHT defines a period of time the CG is held in N during a Neutral HoldPhase (NH-phase), which will be described in greater detail further in the specification. A Neutral Hold Time Counter (NHTC) associated with the NHT begins to count down as soon as any SPS enters the NH-phase.

Next, with continued reference to FIG. 2, the method of programming one or more SPS variables further comprises enabling and configuring a plurality of optional SPS variables associated with improving an activation logic, a deactivation logic, and/or an efficiency of the BCR or the ACR (block 203). While the variables in block 202 are required for any SPS, the following variables are optional, but their enablement and configuration may improve an SPS efficiency during crash reversal operations. In some embodiments, configuration of the required SPS variables may further include at least one of: enabling and configuring a Crash Reversal Engine Speed Limit (CRESL); enabling and configuring a Crash Reversal Enable/Disable Engine Speed (CREDES); enabling and configuring a Crash Reversal Enable Delay Time (CREDT); and/or enabling and configuring Crash Reversal Disable Delay Time (CRDDT), each of which will be described in greater detail below.

For the purposes of the present disclosure, the CRESL defines, if enabled, a different default CES if the BCR or the ACR is the active SPS until a throttle control is returned to the operator. If the CRESL is disabled, the SPESL is the default CES if the BCR or the ACR is the active SPS. In some embodiments, the CRESL may instead define an artificial ceiling for the CES instead of setting the CES.

For the purposes of the present disclosure, the CREDES partially defines if/when the BCR or the ACR is the active SPS in conjunction with the CREDT and the CRDDT. In an embodiment, if the CREDES is enabled, the BCR or the ACR is the active SPS if the ES exceeds the CREDES for longer than the CREDT. Moreover, if the CREDES is enabled, the BCR or the ACR is deactivated if the ES is less than the CREDES for longer than the CRDDT. In an embodiment, if the CREDES is disabled, the BCR or the ACR is the active SPS if a Calculated Deceleration Time (CDT) exceeds, by a multiple, the DT.

And in yet another embodiment, the CDT must exceed at least 20% of the DT.

For the purposes of the present disclosure, the CREDT partially defines if/when the BCR or the ACR is the active SPS in conjunction with the CREDES. In an embodiment, if the CREDT is enabled, the BCR or the ACR is the active SPS if the ES exceeds the CREDES for longer than the CREDT. If the CREDT is disabled, the BCR or the ACR is the active SPS if the ES exceeds the CREDES.

For the purposes of the present disclosure, the CRDDT partially defines if/when the BCR or the ACR is the active SPS in conjunction with the CREDES. In an embodiment, if the CRDDT is enabled, the BCR or the ACR is deactivated if the ES is less than the CREDES for longer than the CRDDT. If the CRDDT is disabled, the BCR or the ACR is deactivated if the ES is less than the CREDES.

For the purposes of the present disclosure, the CDT defines an estimated period of time required for the marine vessel to fully decelerate. In an embodiment, the CDT may be calculated using the following equation:

$$CDT = DT * \left(\frac{AAT}{AT}\right) * \left(\frac{AES - SVMSS}{HI - SVMSS}\right)$$

A Calculated Deceleration Time Counter (CDTC) associated with the CDT may begin to count down as soon as the any SPS enters a Shift Request Phase (SR-phase), which will be discussed in greater detail further below.

For the purposes of the present disclosure, a High Idle Engine Speed (HI) is a preset RPM parameter of the engine 11 and/or the ECU 17. The HI may be set according to known standards within the art and/or according to specific applicational requirements.

For the purposes of the present disclosure, a Slow VesselMode Set Speed (SVMSS) is a preset RPM parameter of the engine 11 and/or the ECU 17. The SVMSS may be set according to known standards within the art and/or according to specific applicational requirements.

For the purposes of the present disclosure, an Actual Acceleration Time (AAT) defines a period of time that the ES has exceeded the SVMSS while the transmission 12 is in the F or the R.

For the purposes of the present disclosure, an Average Engine Speed (AES) defines the average ES over the last [AT] seconds.

With continued reference to FIG. 2, the method of programming one or more SPS further comprises enabling and configuring a plurality of optional SPS variables associated with improving an operating-variable-based shift protection logic of the BCR or the ACR (block 204). Similar to the variables in block 203, the following variables are optional, but their enablement and configuration may improve an SPS efficiency during various crash reversal operations. Moreover, in some embodiments, enablement and configuration of the following, optional SPS variables may be required to enable—and effectively constitute the enablement of—one or more optional SPS. In some embodiments, block 204 may further include at least one of: enabling and configuring an Advanced Crash Reversal Shift Out of Gear Time (ACRSOGT); enabling and configuring an Advanced Crash Reversal Shift into Neutral Time (ACRSTNT); and/or enabling and configuring a Transmission Disengaged Pressure Limit (TDPL), each of which will be described in greater detail below.

For the purposes of the present disclosure, the ACRSOGT partially defines if/when the ACR is activated in conjunction with the ACRSTNT and the TDPL. More specifically, in some embodiments, the ACRSOGT, the ACRSTNT, and the TDPL must all be enabled for the ACR to activate. The ACRSOGT further partially defines a period of time the CG is held in the RG during a Shift Out of Gear Phase (SOG-phase), which will be described in greater detail below. An Advanced Crash Reversal Shift Out of Gear Time Counter (ACRSOGTC) associated with the ACRSOGT begins to count down as soon as the ACR enters the SOG-phase.

For the purposes of the present disclosure, the ACRSTNT partially defines if/when the ACR is activated in conjunction with the ACRSOGT and the TDPL. More specifically, in some embodiments, the ACRSOGT, the ACRSTNT, and the TDPL must all be enabled for the ACR to activate. The ACRSTNT further partially defines a period of time the CG is held in the N during the NH-phase. An Advanced Crash Reversal Shift to Neutral Time Counter (ACRSTNTC) associated with the ACRSTNT begins to count down as soon as the ACR enters the NH-phase.

For the purposes of the present disclosure, the TDPL partially defines if/when the ACR is activated in conjunction with the ACRSOGT and the ACRSTNT. More specifically, in some embodiments, the ACRSOGT, the ACRSTNT, and the TDPL must all be enabled for the ACR to activate. The TDPL further partially defines a period of time the CG is held in the RG during the SOG-phase. If the TDPL is enabled, the ACR exits the SOG-phase if a Transmission Oil Pressure (TOP) reduces to below the TDPL.

For the purposes of this disclosure, a Crank Terminate Speed (CTS) is a non-configurable parameter defining a threshold ES below which the engine 11 is considered stalled.

Likewise, when starting the engine, the CTS may define a threshold ES above which the engine 11 is considered started. The CT may be set according to known standards within the art and/or according to specific applicational requirements. In an embodiment, the ACR exits the SOG-phase if the ES reduces to below a multiple of the CTS. And in yet another embodiment, the ES must reduce to below 120% of the CTS.

Next, with continued reference to FIG. 2, the method of programming one or more SPS further comprises enabling and configuring a plurality of optional SPS variables associated with improving an activation logic, a deactivation logic, and/or an efficiency of the SVMSP (block 205). In some embodiments, the SVMSP and its associated SPS variables provide alternative CES parameters and timing parameters to improve the shift protection logic associated with a Slow VesselMode (SVM). For the purposes of the present disclosure, the SVM is an operating mode of the MPS 1 intended for docking operations, tight vessel maneuvers, operations in no-wake zones, and/or similar circumstances wherein the LI is reduced.

Similar to the variables in block 203 and block 204, the following variables are optional, but their enablement and configuration may improve an SPS efficiency during SVM operations. In some embodiments, enablement and configuration of the following, optional SPS variables may be required to enable—and effectively constitute the enablement of—one or more optional SPS. In some embodiments, block 205 may further include at least one of: enabling and configuring a Slow VesselMode Shift protection engine speed limit (SVMSPESL); enabling and configuring a Slow Vessel Mode Shift Protection Enable/Disable Engine Speed (SVMSPEDES); enabling and configuring a Slow Vessel Mode Shift Protection Enable Time (SVMSPET); enabling and configuring a Slow Vessel Mode Shift Protection Disable Time (SVMSPDT); and/or enabling and configuring a Slow Vessel Mode Shift Protection Hold Time (SVMSPHT), each of which will be described in greater detail below.

For the purposes of the present disclosure, the SVMSPESL defines, if enabled, a different default CES if the SVMSP is the active SPS until a throttle control is returned to the operator. If the SVMSPESL is disabled, the SPESL is the default CES if the active SPS is the SVMSP. In some embodiments, the SVMSPESL may instead define an artificial ceiling for the CES instead of setting the CES.

For the purposes of the present disclosure, the SVMSPEDES partially defines if/when the SVMSP is the active SPS in conjunction with the SVMSPET and the SVMSPDT. In an embodiment, if the SVMSPEDES is enabled, the SVMSP is the active SPS when the ES is less than the SVMSPEDES for longer than the SVMSPET. Moreover, if the SVMSPEDES is enabled, the SVMSP is deactivated when the ES exceeds the SVMSPEDES for longer than the SVMSPDT.

For the purposes of the present disclosure, the SVMSPET partially defines if/when the SVMSP is the active SPS in conjunction with the SVMSPEDES. In an embodiment, if the SVMSPET is enabled, the SVMSP is the active SPS when the ES is less than the SVMSPEDES for longer than the SVMSPET. If the SVMSPET is disabled, the SVMSP is the active SPS when the ES is less than the CREDES.

For the purposes of the present disclosure, the SVMSPDT partially defines if/when the SVMSP is the active SPS in conjunction with the SVMSPEDES. In an embodiment, if the SVMSPDT is enabled, the SVMSP is deactivated if the ES exceeds the SVMSPEDES for longer than the SVMSPDT. If the SVMSPDT is disabled, the SVMSP is deactivated if the ES exceeds the SVMSPEDES.

For the purposes of the present disclosure, the SVMSPHT defines a period of time the CES is held at the SVMSPESL during the SIG-phase. In an embodiment, if the SVMSPHT is enabled, it is used in place of the SPHT if the SVMSP is the active SPS. If the SVMSPHT is disabled, the SPHT is used even if the SVMSP is the active SPS. A Slow Vessel Mode Shift Protection Hold Time Counter (SVMSPHTC) associated with the SVMSPHT begins to count down as soon as the SVMSP enters the SIG-phase.

It is worth noting that, if both the SVMSPESL and the SVMSPHT are disabled, the SPESL and SPHT are used in their places, respectively, such that the shift protection logic of the SVMSP becomes identical to that of the NSP.

Next, with continued reference to FIG. 2, the method of programming one or more SPS further comprises enabling and configuring a plurality of optional SPS variables associated with improving an operating-variable-based shift protection logic of any SPS (block 206). Similar to the variables in block 203, block 204, and block 205, the following variables are optional, but their enablement and configuration may improve an SPS efficiency during any SPS operation, including the BCR, the ACR, the NSP, and the SVMSP. In some embodiments, enablement and configuration of the optional SPS variables may further include at least one of: enabling and configuring a Crash Reversal Exit Engine Speed (CREES); enabling and configuring an Advanced Crash Reversal Shift Into Gear Time (ACRSIGT); and/or enabling and configuring a Transmission Engaged Pressure Limit (TEPL), each of which will be described in greater detail below.

For the purposes of the present disclosure, the CREES partially defines if/when any active SPS may exit the SIG-phase in conjunction with the ACRSIGT and the TEPL. In an embodiment, if the CREES is activated, the active SPS may exit the SIG-phase if the ES exceeds the CREES, and if the TOP exceeds the TEPL or an Advanced Crash Reversal Shift Into Gear Time Counter (ACRSIGTC) elapses.

For the purposes of the present disclosure, the ACRSIGT partially defines if/when any active SPS may exit the SIG-phase in conjunction with the CREES and the TEPL. In an embodiment, if the CREES and the TEPL are enabled, the SPS exits the SIG-phase if the ES exceeds the CREES and the TOP exceeds the TEPL. The ACRSIGTC is associated with the ACRSIGT and begins to count down as soon as the active SPS enters the SIG-phase.

For the purposes of the present disclosure, the TEPL partially defines if/when any active SPS may exit the SIG-phase in conjunction with the CREES and the ACRSIGT. In an embodiment, if the CREES and the ACRSIGT are enabled, the SPS exits the SIG-phase if the ES exceeds the CREES and the ACRSIGTC elapses.

Next, with continued reference to FIG. 2, the method of programming one or more SPS further comprises enabling and configuring a plurality of optional SPS variables associated with the shaft brake 15 (block 207). In some embodiments of the MPS 1 comprising the shaft brake 15, the following variables must be enabled and configured to utilize the shaft brake 15 during an active SPS. In other embodiments, the following variables must be enabled and configured to utilize the shaft brake 15 when there is no active SPS, which will be further discussed below. In yet other embodiments, enablement and configuration of the optional SPS variables may further include: enabling and configuring a Shaft Brake Engage Time (SBET); enabling and configuring a Shaft Brake Engagement Method (SBEM); and enabling and configuring a Shaft Brake Neutral Engage Status (SBNE), each of which will be described in greater detail below.

For the purposes of the present disclosure, the SBET defines a period of time the shaft brake 15 is engaged during the BCR. In some embodiments, the shaft brake 15 may be engaged once the BCR is activated and disengage once the SBET elapses. In some embodiments, if the SBET is disabled, the shaft brake 15 may never be engaged during the BCR.

For the purposes of the present disclosure, the SBEM defines an aspect of the shift protection logic for the shaft brake 15. If the SBEM is configured as Brake with Timer (BWT), the shaft brake 15 may be engaged once the BCR is activated and disengaged once the SBET elapses. If the SBEM is configured as Brake During Directional Shift (BDDR), the shaft brake 15 may be engaged once the BCR is activated and disengaged once the BCR is deactivated and the throttle control is returned to the operator 2.

For the purposes of the present disclosure, the SBNE defines another aspect of the engagement logic for the shaft brake 15. If the SBNE is enabled, the shaft brake 15 may be engaged any time the CG is set to the N.

The above disclosure describes each of the required SPS variables and the optional SPS variables which may be programmed by a technician into the PCP 16. Their enablement and configuration may effectively determine which SPS are enabled, if/when each SPS is activated and/or deactivated, and the particular shift protection logic therein.

Figure 3:
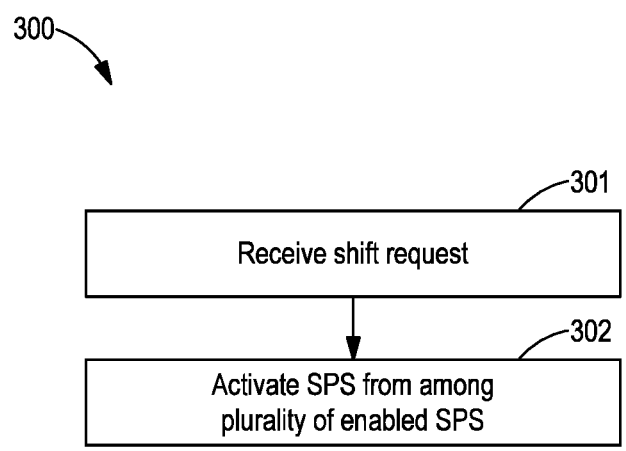
FIG. 3 is a flowchart depicting a method of protecting an engine and a transmission of a marine vessel during gear shifts, according to another embodiment of the present disclosure.

Turning now to FIG. 3, a method of protecting an engine and a transmission of a marine vessel during gear shifts is generally referred to by a reference numeral 300. The method may comprise receiving a SR (301); and activating an SPS from among the plurality of enabled SPS (302). In some embodiments, the plurality of enabled SPS always includes the SPS of the BSP, including the NSP and the BCR, which execute time-based shift protection logic. In the same or other embodiments, the plurality of enabled SPS optionally includes the SPS of the ASP, including the SVMSP and the ACR, which execute alternate time-based and operating-variable-based shift protection logic.

Enablement and configuration of the SPS of the ASP and the optional SPS variables therein may be at the discretion of the technician, operator 2, manufacturer, customer, or other relevant party. In some embodiments, the ACR may provide alternate time-based parameters compared to its BSP counterparts. It may further utilize operating-variable-based shift protection logic to execute faster than the BCR in identical crash reversal scenarios. In the same or other embodiments, the SVMSP may provide alternative CES parameters and timing parameters if the MPS 1 is in the SVM.

Figure 4:
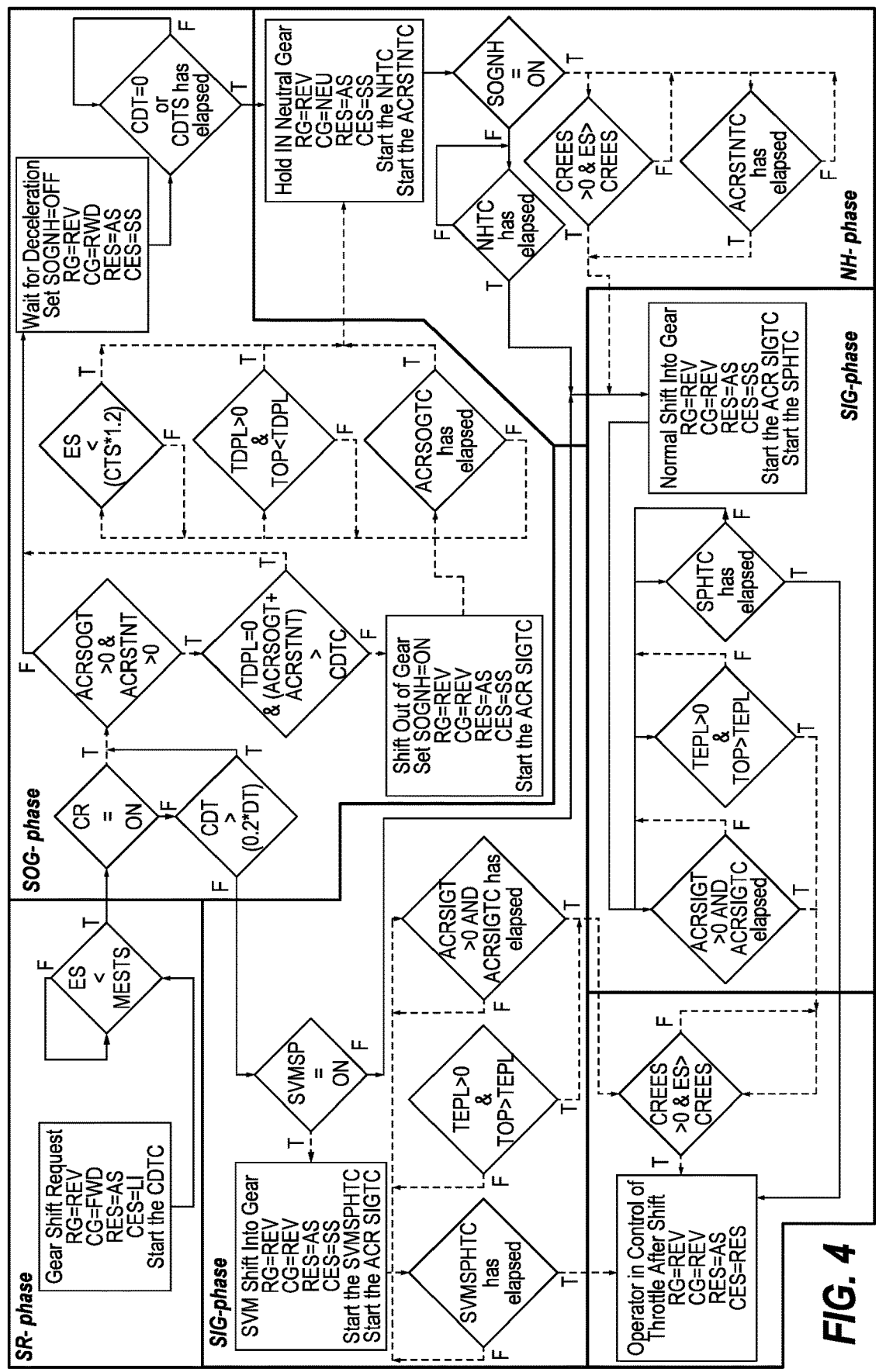
FIG. 4 is a flowchart depicting a plurality of SPS of the ASP, which execute alternate time-based and operating-variable-based shift protection logic, according to an embodiment of the present disclosure.

The activation criteria, deactivation criteria, and shift protection logic for each SPS will now be discussed in greater detail with reference to FIG. 4, which depicts the shift protection logic for each of the NSP, the BCR, the SVMSP, and the ACR. As seen in FIG. 4, the logic of the BSP, which includes at least the NSP and the BCR, is shown by solid arrows. The ASP, which includes the NSP, the BCR, the SVMSP, and the ACR, is shown by both solid arrows and dotted arrows. As previously discussed, the ASP may include all of the SPS of the BSP. Moreover, some, but not necessarily all, of the SPS of the ASP may be incrementally and manually enabled and added to the BSP.

Figure 5:
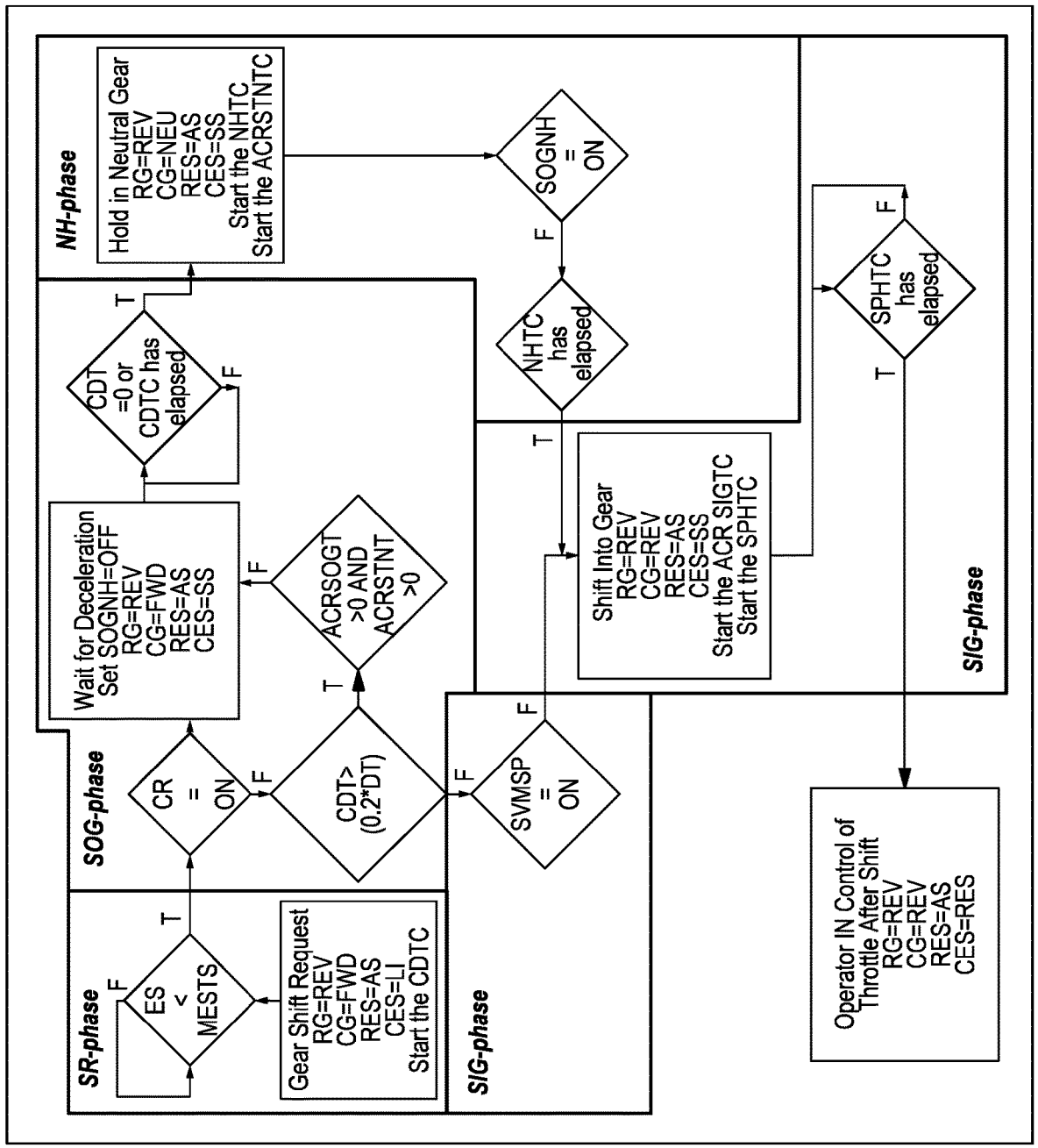
FIG. 5 is a flowchart depicting a plurality of SPS of the BSP, which execute time-based shift protection logic, according to another embodiment of the present disclosure.

FIG. 5 depicts a similar flowchart for the logic of the BSP only, including the NSP and the BCR. It may be noted that all of and only the events of FIG. 4 connected by solid arrows are depicted in FIG. 5.

With reference to both FIGS. 4 and 5, a detailed discussion of each SPS is now provided.

All SPS may include four phases. However, some SPS may skip certain phases and each SPS may spend varying periods of time in each phase.

First, in a Shift Request Phase (SR-phase), a SR is received, which may be a DSR, a SINR, or a SONR.

Second, in a Shift Out of Gear Phase (SOG-phase), the CG is shifted into the RG or the CG is held in the G while the vessel decelerates. If the active SPS is the NSP or the SVMSP, this phase is skipped. If the active SPS is the ACR, the CG is shifted into the RG during the SOG-phase. If the SPS is the BCR, the CG is held in the G during the SOG-phase.

Third, in a Neutral HoldPhase (NH-phase), the CG is shifted into and held in the N. If the SPS is the NSP or the SVMSP, this phase is skipped. If the SPS is the BCR or the ACR, this phase is executed. In some embodiments, the NH-phase is generally shorter for the BCR than the ACR.

Fourth and lastly, in a Shift into Gear Phase (SIG-phase), the CG is shifted into and held in the RG. If the SPS is the NSP or the SVMSP, the prior two phases have been skipped and the SPS begins at the SIG-phase immediately. If the SPS is the BCR or the ACR, the SPS enters the SIG-phase upon completion of the NH-phase. Upon entering the SIG-phase, the BCR and the ACR may behave identically to the NSP if the relevant SPS variables are the same.

With continued reference to FIGS. 4 and 5, the shift protection logic of the BCR is now discussed in greater detail. In some embodiments, the BCR is the default time-based SPS that is employed to prevent directional shifts while the marine vessel is moving fast enough to stall the engine. The BCR may always be enabled. As previously discussed, the BCR includes four phases: the SR-phase, the SIG-phase, the NH-phase, and the SOG-phase.

First, in the SR-phase, a SR is received, and specifically a DSR. As for all active SPS, no gear shifts are allowed unless the MESTS exceeds the ES by at least 50 RPM. If a DSR is received while the ES exceeds the MESTS, then the PCP 16 sets the CES to the LI and maintains the CG at the G until the ES decreases to at least 50 RPM below the MESTS.

It is worth noting that the PCP 16 may override the RES and RG when activating an SPS. In the example shown in FIGS. 4 and 5, the G is in F; the RG is in R; but the CG remains at F. Likewise, while the RES can be Any Speed (AS), the CES has been set to the LI.

Second, the SPS enters the SOG-phase. The BCR is activated if a simulated deceleration time exceeds, by a multiple, the DT. In some embodiments, the simulated deceleration time is defined by the CDT. And in other embodiments, the CDT must exceed at least 20% of the DT to active the BCR. And in yet other embodiments, if the simulated deceleration time exceeds the DT by the required multiple, the BCR is the active SPS unless the ACRSOGT, the ACRSTNT, and the TDPL are all enabled, whereby the ACR becomes the active SPS.

In some embodiments, the BCR may also be activated if a Crash Reversal (CR) variable is enabled, wherein the CR is enabled only if a plurality of optional SPS variables associated with improving an activation logic, a deactivation logic, and/or an efficiency of the BCR or the ACR are enabled and configured. In some embodiments, if the CREDES and the CREDT are enabled, the CR is enabled if the ES exceeds the CREDES for longer than the CREDT. If the CREDES is enabled and the CREDT is disabled, the CR is enabled if the ES exceeds the CREDES.

If the CR is disabled and the simulated acceleration time fails to exceed the DT by the required multiple, a different SPS, such as the NSP or the SVMSP, or no SPS may be activated instead.

If the BCR is the active SPS, contrary to the name, during the SOG-phase, the CG is held in the G. The BCR completes the SOG-phase once the CDT becomes zero or once the CDTC elapses. However, it should be noted that the CDTC begins to count down as soon as the DSR is received, i.e. during the SR-phase, regardless of whether or not the ES is at least 50 RPM below the MESTS.

Third, the BCR enters the NH-phase, wherein the CG is shifted into and held in the N. The NH-phase is complete once the NHTC elapses, which begins to count down as soon as the BCR enters the NH-phase. In some embodiments, a Shift Out of Gear Neutral Hold (SOGNH) variable determines whether to utilize BCR timing parameters or ACR timing parameters during the NH-phase. The SOGNH is disabled if the BCR is the active SPS. If the SOGNH is disabled, the NHTC may dictate a time-based shift protection logic during the NH-phase.

Fourth and lastly, the BCR enters the SIG-phase, wherein the CG is shifted into and held in the RG. The SIG-phase is complete once the SPHTC elapses, which begins to count down as soon as the BCR enters the SIG-phase. Once the SIG-phase is complete, throttle and gear shift control are returned to the operator 2.

As shown in FIG. 4, the SIG-phase of the BCR and, indeed, any SPS may further benefit from enablement and configuration of a plurality of optional SPS variables associated with improving the operating-variable-based shift protection of any SPS. In some embodiments, if the CREES and the TEPL are enabled, the SIG-phase is complete if the ES exceeds the CREES and the TOP exceeds the TEPL. And in other embodiments, if the CREES and the ACRSIGT are enabled, the SIG-phase is complete if the ES exceeds the CREES and the ACRSIGTC elapses.

It is worth noting that, at any point in the above four phases, the BCR may be deactivated. More specifically, in some embodiments, the BCR may further benefit from enablement and configuration of the plurality of optional SPS variables associated with improving the activation logic, the deactivation logic, and/or the efficiency of the BCR or the ACR. In some embodiments, if the CREDES and the CRDDT are enabled, the BCR is deactivated if the CREDES exceeds the ES for longer than the CRDDT. And in other embodiments, if the CREDES is enabled and the CRDDT is disabled, the BCR is deactivated if the ES reduces to below the CREDES.

In those embodiments of the MPS 1 comprising a shaft brake 15, the shaft brake 15 may optionally be engaged during the BCR depending on the configuration and enablement of a plurality of optional SPS variables associated with the shaft brake 15. In the same or other embodiments, engagement of the shaft brake 15 may improve an efficiency of the BCR without employing additional operating-variable-based shift protection logic. It is worth noting that the shaft brake 15 may be engaged during the BCR, but never during the ACR.

In some embodiments, if the SBET is disabled, the shaft brake 15 may never be engaged during the BCR. If the SBET is enable and the SBEM is configured as BWT, the shaft brake 15 may be engaged once the BCR is activated and disengaged once the SBET elapses. If the SBET is enabled and the SBEM is configured as BDDS, the shaft brake 15 may be engaged once the BCR is activated and disengaged once the BCR is deactivated and the throttle control is returned to the operator 2.

In some embodiments, if the SBET has not elapsed prior to the NH-phase, the SBNE criteria overrides control of the shaft brake 15. More specifically, if the SBNE is enabled, the shaft brake 15 may be engaged any time the CG is set to the N.

With continued reference to FIG. 4, the shift protection logic of the ACR is discussed in greater detail. The ACR is an optional SPS that is employed to prevent directional shifts while the marine vessel is moving fast enough to stall the engine. Moreover, the ACR may provide faster directional shifts than the BCR by employing alternate time-based and operating-variable based shift protection logic. As previously discussed, the ACR includes four phases: the SR-phase, the SIG-phase, the NH-phase, and the SOP-phase.

First, in a SR-phase, a SR is received, and specifically a DSR. As for all active SPS, no gear shifts are allowed unless the MESTS exceeds the ES by at least 50 RPM. If a DSR is received while the ES exceeds the MESTS, then the PCP 16 sets the CES to the LI and maintains the CG at the G until the ES decreases to at least 50 RPM below the MESTS.

Second, the SPS enters the SOG-phase. The ACR may be activated if a simulated deceleration time exceeds, by a multiple, the DT. In some embodiments, the simulated deceleration time is defined by the CDT. And in other embodiments, the CDT must exceed at least 20% of the DT.

The ACR may also be activated if the CR is enabled. As previously discussed, if the CREDES and the CREDT are enabled, the CR is enabled if the ES exceeds the CREDES for longer than the CREDT. If the CREDES is enabled and the CREDT is disabled, the CR is enabled if the ES exceeds the CREDES. If the CR is disabled and the CDT fails to exceed the CDT by the required multiple, a different SPS, such as the NSP or the SVMSP, or no SPS may be activated instead.

Furthermore, the ACR is activated only if a plurality of optional SPS variables associated with improving an operating-variable-based shift protection logic of the BCR or the ACR are enabled and configured; and if a maximum period of time required to execute the BCR exceeds a maximum period of time required to execute the ACR. In some embodiments, the ACR is activated only if the ACRSOGT, the ACRSIGT, and the TDPL are enabled. If one or more of the above are disabled, the BCR becomes the active SPS.

And in other embodiments, if the sum of the ACRSOGT and the ACRSTNT exceeds the CDT, then a maximum time period required to perform the ACR may exceed that of the BCR, and the BCR becomes the active SPS.

If the ACR is the active SPS, in line with the name, during the SOG-phase, the CG is shifted into and held in the RG. The SOG-phase is complete if the ACRSOGT elapses, the TDPL exceeds the TOP, or the ES reduces to below a multiple of the CTS. In some embodiments, the ES must reduce to below 120% of the CTS.

Third, the ACR enters the NH-phase, wherein the CG is shifted into and held in the N. As previously discussed, the SOGNH determines whether to utilize BCR timing parameters or ACR timing parameters during the NH-phase. The SOGNH is enabled if the ACR is the active SPS. If the SOGNH is enabled, the NH-phase is complete once any of the following conditions are satisfied. In an embodiment, the NH-phase is complete if the ACRSTNTC elapses. In other embodiments, the ACR may further benefit from the enablement and configuration of a plurality of optional SPS variables associated improving an activation logic, a deactivation logic, and/or an efficiency of the BCR or the ACR. More specifically, in some embodiments, if the CRESL is enabled, the NH-phase is complete once the ES exceeds the CRESL.

Fourth and lastly, the ACR enters the SIG-phase, wherein the CG is shifted into and held in the RG. The SIG-phase is complete once the SPHTC elapses, which begins to count down as soon as the ACR enters the SIG-phase. Once the SIG-phase is complete, throttle and gear shift control are returned to the operator 2.

As shown in FIG. 4, the SIG-phase of the ACR and, indeed, any SPS may further benefit from enablement and configuration of a plurality of optional SPS variables associated with improving the operating-variable-based shift protection of any SPS. In some embodiments, if the CREES and the TEPL are enabled, the SIG-phase is complete if the ES exceeds the CREES and the TOP exceeds the TEPL. And in other embodiments, if the CREES and the ACRSIGT are enabled, the SIG-phase is complete if the ES exceeds the CREES and the ACRSIGTC elapses.

It is worth noting that, at any point in the above four phases, the ACR may be deactivated. Moreover, the ACR may further benefit from enablement and configuration of a plurality of optional SPS variables associated with improving the activation logic, the deactivation logic, and/or the efficiency of the BCR or the ACR. In some embodiments, if the CREDES and the CRDDT are enabled, the ACR is deactivated if the CREDES exceeds the ES for longer than the CRDDT. And in other embodiments, if the CREDES is enabled and the CRDDT is disabled, the ACR is deactivated if the CREDES exceeds the ES.

With continued reference to FIGS. 4 and 5, the shift protection logic of the NPS is examined in greater detail. The NSP is the default SPS that is activated any time the conditions for the BCR, the ACR, and the SVMSP are not met. As previously discussed, the NSP may include the SR-phase, skip the SOG-phase and the NH-phase, and immediately enter the SIG-phase.

First, in a SR-phase, a SR is received, which may be any SR and not necessarily a DSR. As for all active NPS, no gear shifts are allowed unless the MESTS exceeds the ES by at least 50 RPM. If a DSR is received while the ES exceeds the MESTS, then the PCP 16 sets the CES to the LI and maintains the CG at the G until the ES decreases to at least 50 RPM below the MESTS.

Second and lastly, if the conditions for BCR, ACR, and SVMSP are not met, the NSP immediately enters the SIG-phase, wherein the CG is shifted into and held in the RG. The SIG-phase is complete once the SPHTC elapses, which begins to count down as soon as the NSP enters the SIG-phase. Once the SIG-phase is complete, throttle and gear shift control are returned to the operator 2.

As shown in FIG. 4, the SIG-phase of the NSP and, indeed, any SPS may further benefit from enablement and configuration of a plurality of optional SPS variables associated with improving the operating-variable-based shift protection of any SPS. In an embodiment, if the CREES and the TEPL are enabled, the SIG-phase is complete if the ES exceeds the CREES and the TOP exceeds the TEPL. And in other embodiments, if the CREES and the ACRSIGT are enabled, the SIG-phase is complete if the ES exceeds the CREES and the ACRSIGTC elapses.

With continued reference to FIGS. 4 and 5, the shift protection logic of the SVMSP is examined in greater detail. The SVMSP is an optional SPS that provides alternative CES and timing parameters for low engine speed operations. It is the active SPS if the conditions for the BCR and the ACR are not met, and the conditions for the SVMSP are met. As previously discussed, the SVMSP may include the SR-phase, skip the SOG-phase and the NH-phase, and immediately enter the SIG-phase.

First, in a SR-phase, a SR is received, which may be any SR and not necessarily a DSR. As for all active SPS, no gear shifts are allowed unless the MESTS exceeds the ES by at least 50 RPM. If a DSR is received while the ES exceeds the MESTS, then the PCP 16 sets the CES to the LI and maintains the CG at the G until the ES decreases to at least 50 RPM below the MESTS.

Second and lastly, if the conditions for the BCR and the ACR are not met, the SVMSP may be activated only if a plurality of optional SPS variables associated with improving an activation logic, a deactivation logic, and/or an efficiency of the SVMSP are enabled and configured.

In an embodiment, if the SVMSPET is enabled, the SVMSP is activated if the ES is less than the SVMSPEDES for longer than the SVMSPET. And in other embodiments, if the SVMSPET is disabled, the SVMSP is activated if the ES is less than the CREDES. If the SVMSP is not activated, a different SPS, such as the NSP, or no SPS may be activated instead.

If the SVMSP is activated, the SVMSP immediately enters the SIG-phase, wherein the CG is shifted into and held in the RG. The SIG-phase is complete once the SVMSPHTC elapses, which begins to count down as soon as the SVMSP enters the SIG-phase. Once the SIG-phase is complete, throttle and gear shift control are returned to the operator 2.

As shown in FIG. 4, the SIG-phase of the SVMSP and, indeed, any SPS may further benefit from enablement and configuration of a plurality of optional SPS variables associated with improving the operating-variable-based shift protection of any SPS. In an embodiment, if the CREES and the TEPL are enabled, the SIG-phase is complete if the ES exceeds the CREES and the TOP exceeds the TEPL. And in other embodiments, if the CREES and the ACRSIGT are enabled, the SIG-phase is complete if the ES exceeds the CREES and the ACRSIGTC elapses.

It is worth noting that, at any point in the above four phases, the SVMSP may be deactivated. Moreover, the SVMSP may further benefit from enablement and configuration of a plurality of optional SPS variables associated with improving an activation logic, a deactivation logic, and/or an efficiency of the SVMSP. In an embodiment, if the SVMSPEDES and the SVMSPDT are enabled, the SVMSP is deactivated if the ES exceeds the SVMSPEDES for longer than the SVMSPDT. And in other embodiments, if the SVMSPDT is disabled, the SVMSP is deactivated if the ES exceeds the SVMSPEDES.

In some embodiments of the present disclosure, the operator may enter a SINR while an SPS is active, including any of the BCR, the ACR, the NSP, and the SVMSP. In such cases, the PCP 16 may immediately deactivate the active SPS. In the same or other embodiments, if the active SPS is the BCR or the ACR and the active SPS is deactivated before the CDTC elapses, the CDTC may continue to count down. In the same or other embodiments, if the BCR or the ACR is deactivated by a SINR and the CDTC has yet to elapse, if the operator 2 once again requests the opposite gear, then the BCR is (re)activated, where the opposite gear refers to the original RG. It is worth noting that, even if the ACR was the original active SPS, if the above conditions are true, the BCR will be reactivated and not the ACR.

The above disclosure with reference to FIGS. 3-5 describe the shift protection logic associated with a SR, which may be a DSR, a SINR, or a SONR. The shift protection logic for a Split Lever Request (SLR) will now be briefly discussed. For the purposes of the present disclosure, the SLR defines a PSRTP comprising an opposite starboard RG and port side RG, i.e. one in the F and the other in the R. If this is the case, the PCP 16 will not activate the ACR. Moreover, it may be understood that a split lever PSRTP may effectively cause the CDT to reduce to zero, such that the activation conditions for the BCR and the ACR cannot be fulfilled and the NSP becomes the active SPS.

Additional shift protection logic associated with the shaft brake 15 will now be briefly discussed. In some embodiments of the MPS 1 comprising the shaft brake 15, a plurality of optional SPS variables associated with the shaft brake 15 must be enabled and configured to utilize the shaft brake 15 when there is no active SPS. Specifically, if the SBNE is enabled, the shaft brake 15 may be engaged any time the CG is set to the N. It is worth noting, however, that the shaft brake 15 will never be engaged when shifting out of the N.

Lastly, in some embodiments of the present disclosure, if the MPS 1 is in a Traditional TrollMode (TTM), shift protection is not required and the PCP 16 does not activate any of the plurality of enabled SPS.

INDUSTRIAL APPLICATION

The modular shift protection algorithm of the present disclosure may be employed in any number of marine vessels, including but not limited to container ships, tankers, passenger ships, fishing vessels, motor yachts, personal watercraft, and yet other vessels, where no limitation is intended herein. Moreover, the disclosed shift protection logic may be applied to marine vessels and marine propulsion systems comprising a single engine, transmission, and propeller; or marine vessels and marine propulsion systems comprising two or more independent sets of engines, transmissions, and propellers, e.g. one located on each of a port side and a starboard side. In some embodiments, the disclosed shift protection logic may operatively control and utilize one or more shaft brakes to further improve the efficiency of the relevant SPS. And in other embodiments, the disclosed SPS may be programmed into and executed by a PCP interoperable with a number of mechanical systems, electrical systems, and communication protocols of the marine vessel.

Advantageously, the plurality of SPS and the shift protection logic therein of the present disclosure include both simple, time-based shift protection logic and complex, operating-variable-based shift protection logic. Perhaps more importantly, the SPS of the ASP may further be modularized and incrementally implemented, such that a full spectrum of shift protection protocols is offered in a single package. The combination of enabled and/or configured SPS may be customized by the manufacturer, distributor, client, customer, etc., and may further be adjusted in the future by reprogramming the PCP without the need for hardware alterations.

The disclosed shift protection algorithms may be employed during normal shifting operations, including directional shift requests, shifts into and out of neutral requests, and split lever requests; crash reversal operations; slow vessel mode operations; traditional troll mode operations; and yet other operating scenarios. By employing the disclosed methods, multiple shift protection strategies may be combined into a single configurable system.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

The invention claimed is:

1. A method of programming one or more shift protection sequences (SPS) which protect an engine and a transmission of a marine vessel during gear shifts, the method comprising the steps of:
   configuring a shift protection type (SPT) to be a basic shift protection (BSP) or an advanced shift protection (ASP), wherein:
     if the SPT is configured to be the BSP, by default, a normal shift protection (NSP) and a basic crash reversal (BCR) are enabled; or
     if the SPT is configured to be the ASP, by default, the NSP, the BCR, a slow vessel mode shift protection (SVMSP) and an advanced crash reversal (ACR) are enabled; and
   configuring a plurality of required SPS variables, including:
     configuring a maximum engine speed to shift (MESTS);
     configuring a shift protection engine speed limit (SPESL);
     configuring a shift protection hold time (SPHT);
     configuring an acceleration time (AT);
     configuring a deceleration time (DT); and
     configuring a neutral hold time (NHT).

2. The method according to claim 1, wherein the default SPS of the ASP may be incrementally enabled and added to the BSP; and wherein the default SPS of the ASP may be incrementally disabled and removed from the ASP.

3. The method according to claim 1, further comprising the step of enabling and configuring a plurality of optional SPS variables associated with improving an activation logic, a deactivation logic, and/or an efficiency of the BCR or the ACR, including at least one of:
   enabling and configuring a crash reversal engine speed limit (CRESL);
   enabling and configuring a crash reversal enable/disable engine speed (CREDES);
   enabling and configuring a crash reversal enable delay time (CREDT); and/or
   enabling and configuring a crash reversal disable delay time (CRDDT).

4. The method according to claim 1, further comprising the step of enabling and configuring a plurality of optional SPS variables associated with improving an operating-variable-based shift protection logic of the BCR or the ACR, including at least one of:
   enabling and configuring an advanced crash reversal shift out of gear time (ACRSOGT);
   enabling and configuring an advanced crash reversal shift into neutral time (ACRSTNT);
   and/or
   enabling and configuring a transmission disengaged pressure limit (TDPL).

5. The method according to claim 1, further comprising the step of enabling and configuring a plurality of optional SPS variables associated with improving an activation logic, a deactivation logic, and/or an efficiency of the SVMSP, including at least one of:
   enabling and configuring a slow vessel mode shift protection engine speed limit (SVMSPESL);
   enabling and configuring a slow vessel mode shift protection enable/disable engine speed (SVMSPEDES);
   enabling and configuring a slow vessel mode shift protection enable time (SVMSPET);
   enabling and configuring a slow vessel mode shift protection disable time (SVMSPDT); and/or
   enabling and configuring a slow vessel mode shift protection hold time (SVMSPHT).

6. The method according to claim 1, further comprising the step of enabling and configuring a plurality of optional SPS variables associated with improving an operating-variable-based shift protection logic of any SPS, including at least one of:
   enabling and configuring a crash reversal exit engine speed (CREES);
   enabling and configuring an advanced crash reversal shift into gear time (ACRSIGT); and/or
   enabling and configuring a transmission engaged pressure limit (TEPL).

7. The method according to claim 1, further comprising the step of enabling and configuring a plurality of optional SPS variables associated with a shaft brake, including:

enabling and configuring a shaft brake engage time (SBET);

enabling and configuring a shaft brake engagement method (SBEM); and enabling and configuring a shaft brake neutral engage status (SBNE).

8. A method of protecting an engine and a transmission of a marine vessel during gear shifts, the method comprising the steps of:

receiving a shift request (SR); and activating a shift protection sequence (SPS) from among a plurality of enabled SPS;

wherein the plurality of enabled SPS always includes a normal shift protection (NSP) and a basic crash reversal (BCR) which execute time-based shift protection logic;

wherein the plurality of enabled SPS includes a slow vessel mode shift protection (SVMSP) and an advanced crash reversal (ACR) which execute alternate time-based and operating-variable-based shift protection logic.

9. The method according to claim 8, wherein the step of receiving the SR includes receiving a directional shift request (DSR);

wherein the SPS being activated from among the plurality of enabled SPS is the BCR if:

a simulated deceleration time exceeds, by a multiple, a deceleration time (DT);

wherein activating the BCR further includes executing the following time-based shift protection logic:

holding the transmission in a current gear (G);

shifting the transmission into a neutral gear (N);

holding the transmission in the N;

shifting the transmission into a requested gear (RG);

holding the transmission in the RG; and returning a throttle control to an operator.

10. The method according to claim 9, wherein activating the BCR further includes executing the following time-based shift protection logic:

holding the transmission in the G;

shifting the transmission into the N once a calculated deceleration time counter (CDTC) elapses;

holding the transmission in the N;

shifting the transmission into the RG once a neutral hold time counter (NHTC) elapses;

holding the transmission in the RG; and returning the throttle control to the operator once a shift protection hold time counter (SPHTC) elapses.

11. The method according to claim 9, wherein activating the BCR further includes executing the following time-based shift protection logic if a shaft brake is installed and a plurality of optional SPS variables associated with the shaft brake are enabled and configured:

engaging the shaft brake once the BCR is activated; and disengaging the shaft brake once:

a shaft brake engage time (SBET) elapses, or the throttle control is returned to the operator.

12. The method according to claim 9, wherein the SPS being activated from among the plurality of enabled SPS is the ACR only if:

a plurality of optional SPS variables associated with improving an operating-variable-based shift protection logic of the BCR or the ACR are enabled and configured; and a maximum period of time required to execute the BCR exceeds a maximum period of time required to execute the ACR;

wherein activating the ACR further includes executing the following alternate time-based and operating-variable-based shift protection logic:

shifting the transmission into the RG;

holding the transmission in the RG;

shifting the transmission into the N;

holding the transmission in the N;

shifting the transmission into the RG;

holding the transmission in the RG; and returning the throttle control to the operator.

13. The method according to claim 12, wherein the SPS being activated from among the plurality of enabled SPS is the ACR only if:

an advanced crash reversal shift out of gear time (ACRSOGT), an advanced crash reversal shift to neutral time (ACRSTNT), and a transmission disengaged pressure limit (TDPL) are enabled and configured; and a simulated deceleration time exceeds, by a multiple, a deceleration time (DT); or if a crash reversal enable delay time (CREDT) is enabled, an engine speed (ES) exceeds a crash reversal enable/disable engine speed (CREDES) for longer than the CREDT; or if the CREDT is disabled, the ES exceeds the CREDES.

14. The method according to claim 13, wherein activating the ACR further includes executing the following alternate time-based and operating-variable-based shift protection logic:

shifting the transmission into the RG;

holding the transmission in the RG;

shifting the transmission into the N once:

an advanced crash reversal shift out of gear time counter (ACRSOGTC) elapses, a transmission oil pressure (TOP) reduces to below, or the ES reduces to below a multiple of a crank terminate speed (CTS);

holding the transmission in the N;

shifting the transmission into the RG once:

the ACRSTNT elapses, or the ES exceeds a crash reversal engine speed limit (CRESL);

holding the transmission in the RG; and returning the throttle control to the operator.

15. The method according to claim 8, wherein the SPS being activated from among the plurality of enabled SPS is the SVMSP only if:

a plurality of optional SPS variables associated with improving an activation logic, a deactivation logic, and/or an efficiency of the SVMSP are enabled and configured;

wherein activating the SVMSP further includes executing the following alternate time-based and operating-variable-based shift protection logic:

shifting the transmission into the RG;

holding the transmission in the RG; and returning the throttle control to the operator once a slow vessel mode shift protection hold time counter (SVMSPHTC) elapses.

16. The method according to claim 15, wherein the SPS being activated from among the plurality of enabled SPS is the SVMSP only if:

if a slow vessel mode shift protection enable time (SVMSPET) is enabled, a slow vessel mode shift protection enable/disable engine speed (SVMSPEDES) exceeds an engine speed (ES) for at least the SVMSPET; or if the SVMSPET is disabled, a crash reversal enable disable engine speed (CREDES) exceeds the ES.

17. The method according to claim 8, wherein the SPS being activated from among the plurality of enabled SPS is the NSP only if:
the BCR, the ACR, and the SVMSP are not activated;
wherein activating the NSP further includes executing the following time-based shift protection logic:
shifting the transmission into a requested gear (RG);
holding the transmission in the RG; and
returning a throttle control to an operator once a shift protection hold time counter (SPHTC) elapses.

18. The method according to claim 8, wherein activating the SPS from among the plurality of enabled SPS further includes executing the following time-based and operating-variable-based shift protection logic if a plurality of optional SPS variables associated with improving an operating-variable-based shift protection logic of any SPS are enabled and configured:
holding a transmission in a requested gear (RG); and
returning a throttle control to an operator once:
an engine speed (ES) exceeds a crash reversal exit engine speed (CREES); and
an advanced crash reversal shift into gear time counter (ACRSIGTC) elapses; or
a transmission oil pressure (TOP) exceeds a transmission engaged pressure limit (TEPL).

19. The method according to claim 8, further comprising the step of deactivating the active SPS;
wherein the BCR or the ACR is deactivated if:
if a crash reversal disable delay time (CRDDT) is enabled, a crash reversal enable disable engine speed (CREDES) exceeds an engine speed (ES) for longer than the CRDDT; or
if the CRDDT is disabled, the CREDES exceeds the ES;
wherein the SVMSP is deactivated if:
if a slow vessel mode shift protection disable time (SVMSPDT) is enabled, an engine speed (ES) exceeds a slow vessel mode shift protection enable disable engine speed (SVMSPEDES) for longer than the SVMSPDT; or
if the SVMSPDT is disabled, the ES exceeds the SVMSPEDES;
wherein any active SPS is deactivated if:
a shift into neutral request (SINR) is received.

20. The method according to claim 8, wherein activating the SPS from among the plurality of enabled SPS further includes executing the following shift protection logic if a shaft brake is installed and a plurality of optional SPS variables associated with the shaft brake are enabled and configured:
engaging the shaft brake any time a transmission is shifted into a neutral gear (N).

* * * * *